A. W. ANTHOINE.
Vehicle-Hubs.
No. 205,333. Patented June 25, 1878.
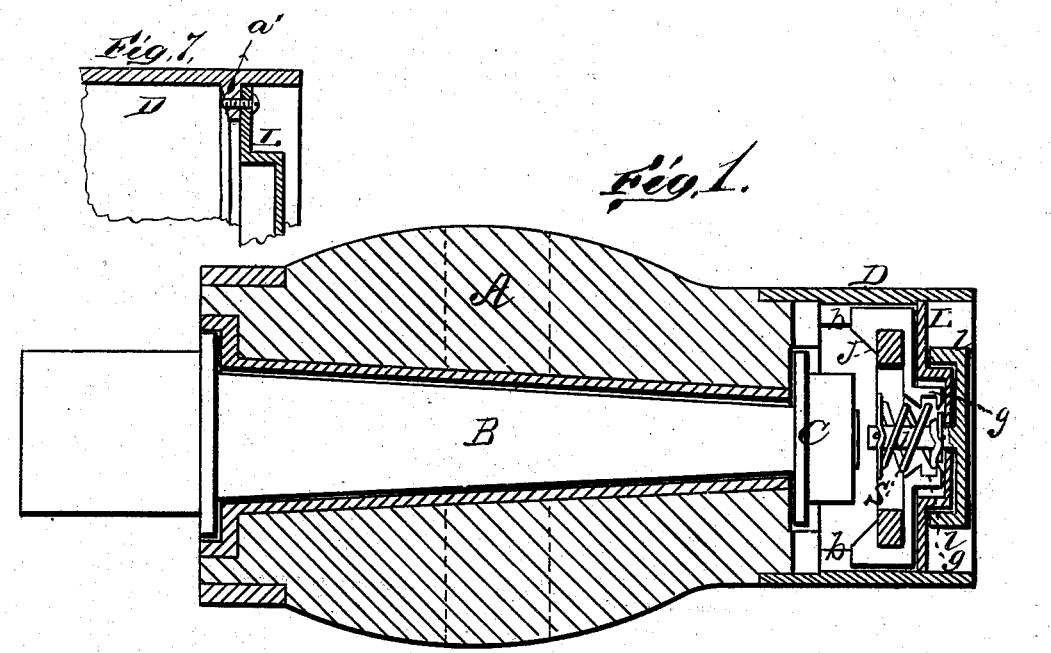
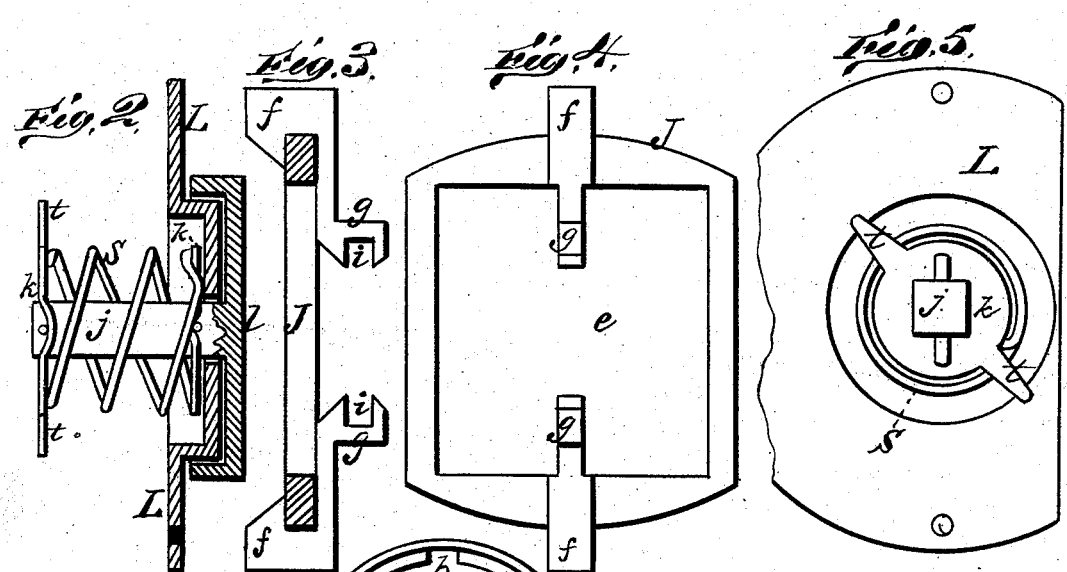
WITNESSES
H. Bates
F. J. Masi
INVENTOR
Alfred W. Anthoine,
by E. W. Anderson,
ATTORNEY

UNITED STATES PATENT OFFICE.

ALFRED W. ANTHOINE, OF MINOT, MAINE.

IMPROVEMENT IN VEHICLE-HUBS.

Specification forming part of Letters Patent No. 205,333, dated June 25, 1878; application filed May 18, 1878.

*To all whom it may concern:*

Be it known that I, ALFRED W. ANTHOINE, of Minot, in the county of Androscoggin and State of Maine, have invented a new and valuable Improvement in Vehicle-Hubs; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal central section of my improved hub; and Figs. 2, 3, 4, 5, and 6 are details of parts of the same.

The object of the invention is to take off the nut from the arm and remove the wheel without using a wrench or other equivalent device.

The nature of this invention consists in the construction and novel arrangement of the grooved and chambered cap-plate for the hub, the spindle-nut in the bottom of the cap-chamber, the reciprocating nut-holder, having guide-flanges, the cap-plate, the turning head and shank, and the central helical guide, whereby the nut-holder can be guided to the bottom of the cap-chamber to engage with the spindle-nut or be relieved therefrom without using a separate wrench or tool, as hereinafter shown and described.

In the annexed drawings, the letter A designates a hub or nave; B, the spindle, and C the nut screwed upon the end of said spindle and securing the wheel thereon. This nut is partly recessed into the end of the hub. D indicates the outer hub-band, secured in the usual manner thereon, and having near its outer edge a flange, $a$. This hub-band is of sufficient depth to form a cap-chamber beyond the end of the hub, and its flange $a$ is provided with screw-seats $a'$, for the attachment of the fastening-screws of the face-plate L. It also has opposite grooves $b$ upon its inside, for a purpose hereinafter explained.

J represents a metallic nut-holder, having an opening, $e$, therein, adapted to receive the nut C, and of the same form as said nut, and provided with opposite offsets $f$, that engage the grooves $b$ aforesaid and lock the said plate to the hub, so as to be incapable of rotating independently thereof. This plate J slides in the grooves $b$ aforesaid into and out of engagement with the nut, and when in engagement with it, if the wheel be turned to the right, the thread on the spindle, being left-handed, causes the said nut to be unscrewed from the said spindle, when the wheel may be taken off therefrom. These movements are carried out without removing any portion of the hub by means as follows: The nut-holder is provided upon its outer face with opposite offsets $g$, in the opposite faces of which are the notches $i$. These notches engage the branches of double spiral spring S, coiled around a post, $j$, rotating in bearings in the face-plate L, that is seated upon the flange $a$, and is secured thereto by means of suitable screws. The post $j$ is, in cross-section, rectangular, and has two spaced metallic heads, $k$, applied thereon, to which the ends of the spring S are secured. The outer head $k$ is movable on the post, and allows the spring S to be compressed, and it is also provided with projecting arms $t$, serving as stops to prevent the disengagement of the screw-spring S from the notches $i$ aforesaid. Upon the outside of this post, and fitting snugly upon the face-plate L, is a polygonal head, $l$, by turning which the post and screw are actuated. The screw-spring S, by being turned to the right as far as possible by means of the hand-head $l$, throws the wrench-plate into engagement with the nut on the end of the spindle, and, by turning the wheel to the right, unscrews the nut from the said spindle and allows the wheel to be taken off without opening the hub or using a wrench.

To secure the wheel upon the axle, the spindle is introduced into the hub and the wheel turned over to the left until the nut is screwed onto the spindle. The hand-head $l$ is then turned to the left, thereby disengaging the wrench-plate from the nut, until it can be turned no farther. The operation is then complete, and the vehicle may be moved backward or forward without danger of the wheels running off the spindle.

Access is had to the interior of the hub-band, to oil the parts, by removing the screws and taking out the face and wrench plates. If the hand-nut $l$ be turned to the right until it stops, the face and wrench-plates may be taken out together. In forcing the wrench-plate or nut-holder into engagement with the nut, if it should fail to strike fairly on the same, it may be made to do so by turning the wheel, elastic pressure being obtained on the nut-holder through the medium of the spring-screw aforesaid.

What I claim as new, and desire to secure by Letters Patent, is—

1. The combination, with the vehicle-hub, its grooved band D, the axle-spindle, and its nut C, of the flanged nut-holder J, having the offsets $g$, the cap-plate L, the turning head $l$, its shank or post $j$, and the double-branched helical spring S, substantially as specified.

2. In a hub, the projecting band D, forming a chamber beyond end of hub, the cap-plate L, and the turning head $l$, having a shank extending through said cap-plate and supporting a nut-holder, J, through the medium of a spring or yielding connection attached to said shank, substantially as specified.

3. The cap-plate L, having the central turning shank $j$, provided on the outside of said plate with a turning head, $l$, and on the inside of the same with a spiral yielding guide, and a reciprocating nut-holder engaging therewith, substantially as specified.

In testimony that I claim the above I have hereunto subscribed my name in the presence of two witnesses.

ALFRED W. ANTHOINE.

Witnesses:
 ANDREW J. EASTMAN,
 G. G. BRIDGHAM.